(12) United States Patent
Bartel et al.

(10) Patent No.: US 8,905,434 B1
(45) Date of Patent: Dec. 9, 2014

(54) ROLLOVER PROTECTION APPARATUS

(71) Applicant: Excel Industries, Inc., Hesston, KS (US)

(72) Inventors: Harlan John Bartel, Newton, KS (US); Brian Lee Nebel, Hesston, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 13/655,014

(22) Filed: Oct. 18, 2012

Related U.S. Application Data

(63) Continuation-in-part of application No. 12/945,277, filed on Nov. 12, 2010, now Pat. No. 8,528,924.

(60) Provisional application No. 61/281,059, filed on Nov. 12, 2009.

(51) Int. Cl.
*B60R 21/13* (2006.01)

(52) U.S. Cl.
CPC .................................... *B60R 21/131* (2013.01)
USPC ...................... 280/756; 296/35.2; 296/190.03

(58) Field of Classification Search
CPC ........................... B60R 1/13; B60R 2021/134
USPC .............................. 280/756; 296/35.2, 190.03
See application file for complete search history.

(56) References Cited

U.S. PATENT DOCUMENTS

| | | | |
|---|---|---|---|
| 4,666,183 A | 5/1987 | Azzarello | |
| 4,877,265 A | 10/1989 | DeBraal et al. | |
| 4,949,991 A | 8/1990 | Ludwig | |
| 5,042,835 A | 8/1991 | Burns | |
| 5,129,676 A | 7/1992 | Sheehan | |
| 5,503,430 A | 4/1996 | Miki et al. | |
| 5,779,272 A | 7/1998 | Panek et al. | |
| 5,839,758 A | 11/1998 | Finch | |
| 7,222,882 B2 | 5/2007 | Boucher | |
| 7,396,047 B1 | 7/2008 | Young | |
| 7,438,319 B2 | 10/2008 | Cooper et al. | |
| 7,568,732 B2 | 8/2009 | Schlup | |
| 7,971,904 B2 | 7/2011 | David | |
| 7,971,905 B2 | 7/2011 | McCord et al. | |
| 8,016,320 B2 | 9/2011 | Becker | |
| 8,029,019 B2 | 10/2011 | Schmidt et al. | |
| 8,403,363 B2 | 3/2013 | Duenchel et al. | |
| 8,424,911 B2 | 4/2013 | Alexander, IV | |
| 8,523,225 B2 | 9/2013 | Reinke et al. | |
| 8,528,924 B1 | 9/2013 | Bartel et al. | |
| 2005/0212278 A1 | 9/2005 | Kurten | |

(Continued)

FOREIGN PATENT DOCUMENTS

EP 0051100 5/1982

(Continued)

OTHER PUBLICATIONS

University of Tennessee, Knoxville, Powered Foldable ROPS, Senior Project, Document created May 1, 2009, Publication Date Unknown.

*Primary Examiner* — Ruth Ilan

(57) ABSTRACT

A rollover protection apparatus unlocks and lowers from a raised position to a lowered position suitable for clearing a low hanging obstacle when an operator applies a force to an operator lever or pedal. The rollover protection apparatus returns to the raised position when the operator ceases applying force to the operator lever or pedal.

8 Claims, 11 Drawing Sheets

(56) References Cited

U.S. PATENT DOCUMENTS

| | | |
|---|---|---|
| 2005/0217232 A1 | 10/2005 | Asaharn et al. |
| 2006/0001248 A1 | 1/2006 | Queveau et al. |
| 2007/0290493 A1 | 12/2007 | David |
| 2008/0309058 A1 | 12/2008 | Kurten |

FOREIGN PATENT DOCUMENTS

| | | |
|---|---|---|
| EP | 1197399 | 11/2003 |
| EP | 1844990 | 2/2012 |
| FR | 2541953 | 3/1983 |
| GB | 2175259 | 11/1986 |
| JP | H0640299 | 2/1994 |
| JP | H07323798 | 12/1995 |

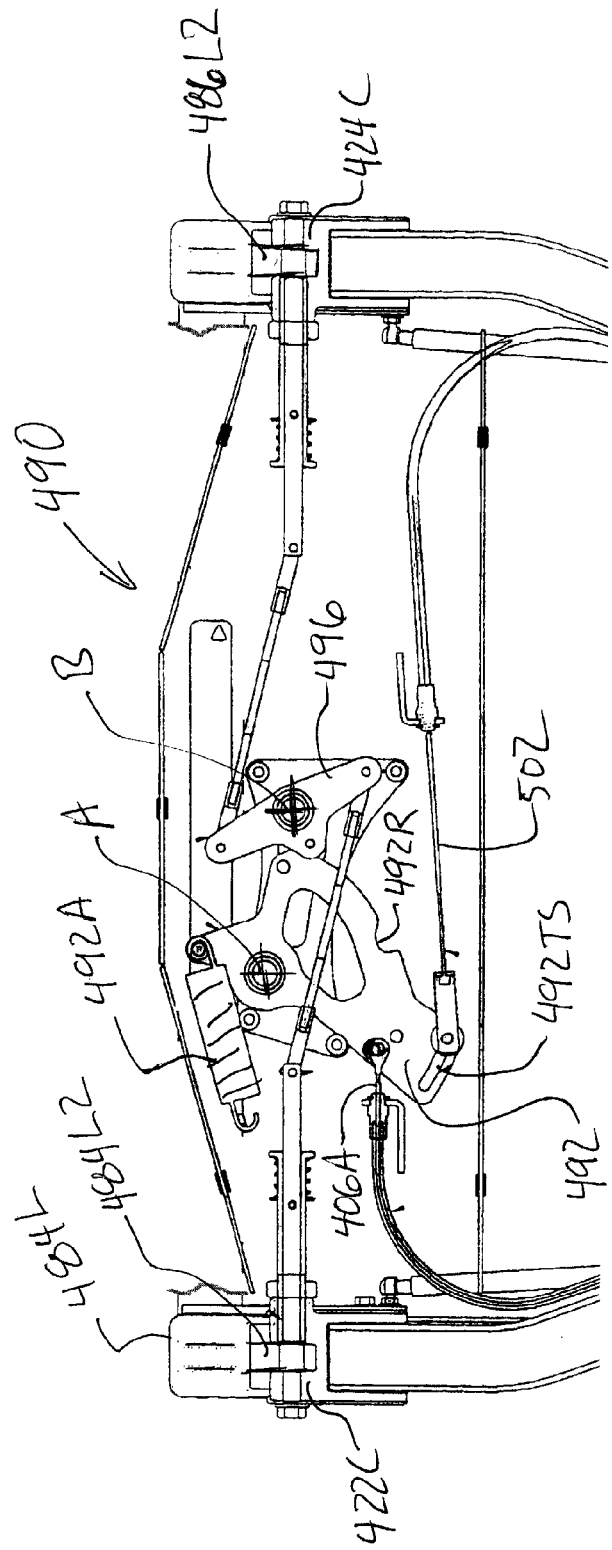

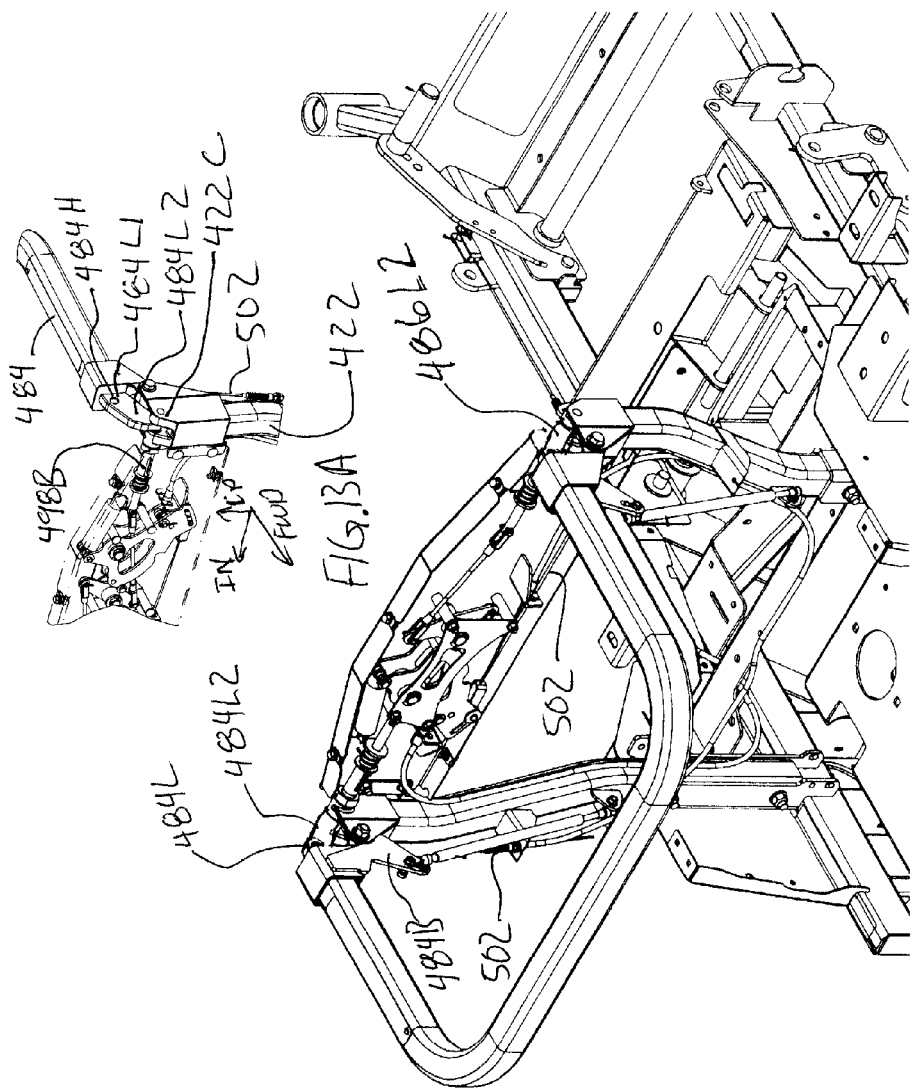

ized position to the lowered position. The raising and lowering mechanism is also adapted so that when the operator ceases applying force to the operator lever, the upper portion moves from the lowered position to the raised position at which point the lock re-engages.

ROLLOVER PROTECTION APPARATUS

RELATED APPLICATIONS

This application is a Continuation-in-Part of U.S. patent application Ser. No. 12/945,277 filed on Nov. 12, 2010 which is incorporated herein by reference.

U.S. patent application Ser. No. 12/945,277 claimed the benefit of U.S. Provisional Patent Application Ser. No. 61/281,059 filed on Nov. 12, 2009 which is incorporated herein by reference.

FIELD

This invention relates to a rollover protection apparatus which moves from a raised position to a lowered position suitable for clearing a low hanging obstacle.

BACKGROUND

Numerous rollover protection apparatuses may be found in the prior art. Various prior art rollover protection apparatuses teach various ways for folding down, retracting or telescoping a upper portion of a roll bar assembly usually in order to clear low hanging obstacles. Typically, the prior art teaches various types of joints that can be manually adjusted to lower the upper portion of a roll bar assembly. A problem that arises when using prior art retractable rollover protection apparatuses arises when an operator begins work in an area which includes low hanging obstacles. The potential exists for an operator to merely place the upper portion of a roll bar assembly in a lowered position prior to working in such an area. If the same area also includes a sloped surface and the operator fails to return the upper portion of the roll bar assembly to the raised position suitable for protecting the operator during a roll over, the operator will be exposed to a roll over hazard. What is needed is a rollover protection apparatus wherein an operator may quickly and temporarily lower the upper portion of a roll bar assembly to clear a low hanging obstacle and which automatically returns to a raised position when the operator is no longer acting to cause the upper portion to be lowered. With such a rollover protection apparatus, the upper portion of the roll bar assembly would lower only as needed to clear low hanging obstacles and would otherwise remain in a raised position suitable for protecting the operator during a roll over.

SUMMARY

In order to overcome the above stated problems and limitations there is provided an improved rollover protection apparatus for a vehicle which may be selectively lowered to clear low hanging obstacles. The improved rollover protection apparatus includes a roll bar assembly and a lowering and raising mechanism. The roll bar assembly includes a lower portion that is mounted to the vehicle frame and an upper portion that is mounted to the lower portion. The upper portion is movably mounted to the lower portion so that the upper portion may move between a raised position and a lowered position. A lock is associated with the upper portion and the lower portion such that when the upper portion is in the raised position, the lock secures the upper portion sufficiently to the lower portion so that the roll bar assembly will support the vehicle and protect the operator should the vehicle rollover.

The raising and lowering mechanism includes an operator lever. The operator lever may take the form of a handle, a foot pedal or any other movable element suitable for receiving a manually applied force from an operator. The raising and lowering mechanism is adapted so that when the operator of the vehicle applies sufficient force to the operator lever, the raising and lowering mechanism unlocks the upper portion of the roll bar assembly and urges the upper portion to move from the raised position to the lowered position. The raising and lowering mechanism is also adapted so that when the operator ceases applying force to the operator lever, the upper portion moves from the lowered position to the raised position at which point the lock re-engages.

Accordingly, an operator using the improved rollover protection apparatus may apply force to the operator lever to cause the upper portion of the roll bar assembly to move to the lowered position to clear an low hanging obstacle. When the vehicle has cleared the low hanging obstacle, the operator can stop applying force to the operator lever thereby allowing the upper portion of the roll bar assembly to return to the raised position where the lock re-engages to sufficiently secure the upper portion in the raised position to protect the operator should the vehicle roll over.

BRIEF DESCRIPTION OF THE DRAWINGS

FIG. 12 is a rear view of the second embodiment of the rollover protection apparatus showing the upper portion of the roll bar assembly in the lowered position and the upper portion actuator cable fully extended.

FIG. 13 is a perspective view of the second embodiment of the rollover protection apparatus showing the upper portion of the roll bar assembly in the lowered position.

FIG. 13A is a magnified perspective view of the second embodiment of the rollover protection apparatus showing the details of the pivot joint between the lower portion and the upper portion of the roll bar assembly.

DETAILED DESCRIPTION

Figure 1:
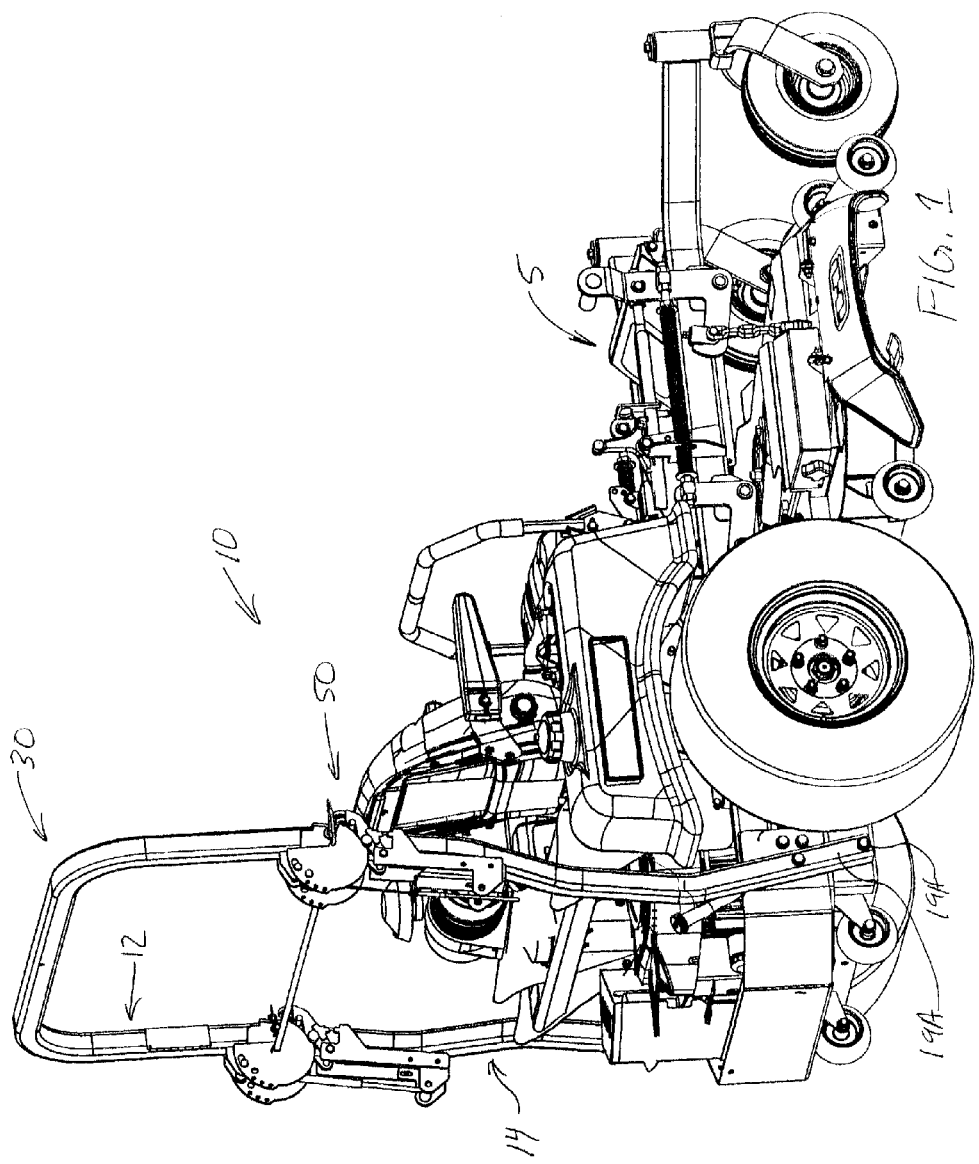
FIG. 1 is a perspective view of the improved rollover protection apparatus installed on a vehicle.

Referring to the drawings, FIG. 1 shows an example embodiment of the improved rollover protection apparatus 10 installed on vehicle 5. In this example, vehicle 5 may be any type of vehicle but will most typically be a riding lawn mower, tractor or other such vehicle which is likely to be exposed to a risk of a roll over. As can be seen in FIG. 1, improved rollover protection apparatus 10 includes a roll bar assembly 12, a raising and lowering mechanism 50 and an operator lever assembly 50. Roll bar assembly includes a lower portion 14 which is fixed to the frame of vehicle 5 and a upper portion 30 which is pivotably mounted to lower portion 14.

Figure 3:
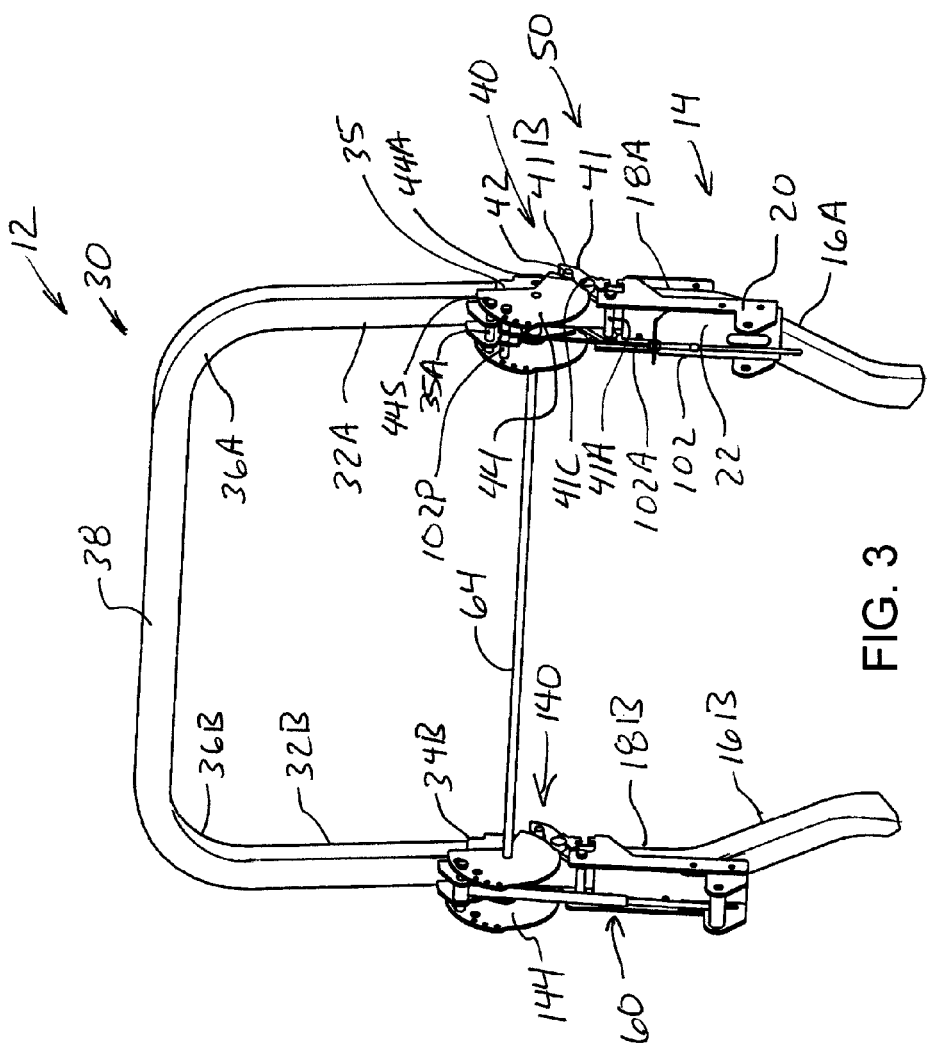
FIG. 3 is a perspective view of a roll bar assembly.

As can be best seen by referring to FIG. 3, lower portion 14 of roll bar assembly 12, in this example, includes two spaced bottom members 16A and 16B. Each of the two spaced bottom members 16A and 16B have upper ends 18A and 18B respectively and lower ends 19A and 19B respectively where, in this example, may be found bolt holes 19H for receiving bolts (shown in FIG. 1) for fixing bottom members 16A and 16B to the frame of vehicle 5. As can be seen in FIG. 3, upper portion 30 includes two side members 32A and 32B. Each side member 32A and 32B includes lower ends 34A and 34B respectively and upper ends 36A and 36B respectively. A top transverse member 38 connects between upper ends 36A and 36B to complete a rigid upside down U shaped upper portion 30.

As can be best seen by referring to FIGS. 3-8, lower ends 34A and 34B of side members 32A and 32B are pivotably mounted to the upper end 18A and 18B of bottom members 16A and 16B respectively. The joints between the lower ends of side members 32A and 32B and the upper ends of bottom members 16A and 16B are adapted to allow upper portion 30 to pivot counterclockwise as viewed in FIGS. 3-8 between the raised position shown in FIGS. 1, 3, 4, 5 and 6 to the lowered position shown in FIG. 8. In the alternative, relative movement between upper portion 30 and lower portion 12 as upper portion 30 moves between the raised position and a lowered position could be accomplished by a translation such as with a telescoping structure or by a pivoting parallelogram structure or the like. The pivoting structure shown and described in this example is merely one way of accomplishing movement between a raised position and a lowered position. The remaining elements of the raising and lowering mechanism which will be described in greater detail below, are, out of necessity, adapted to function with a pivoting structure.

Figure 4:
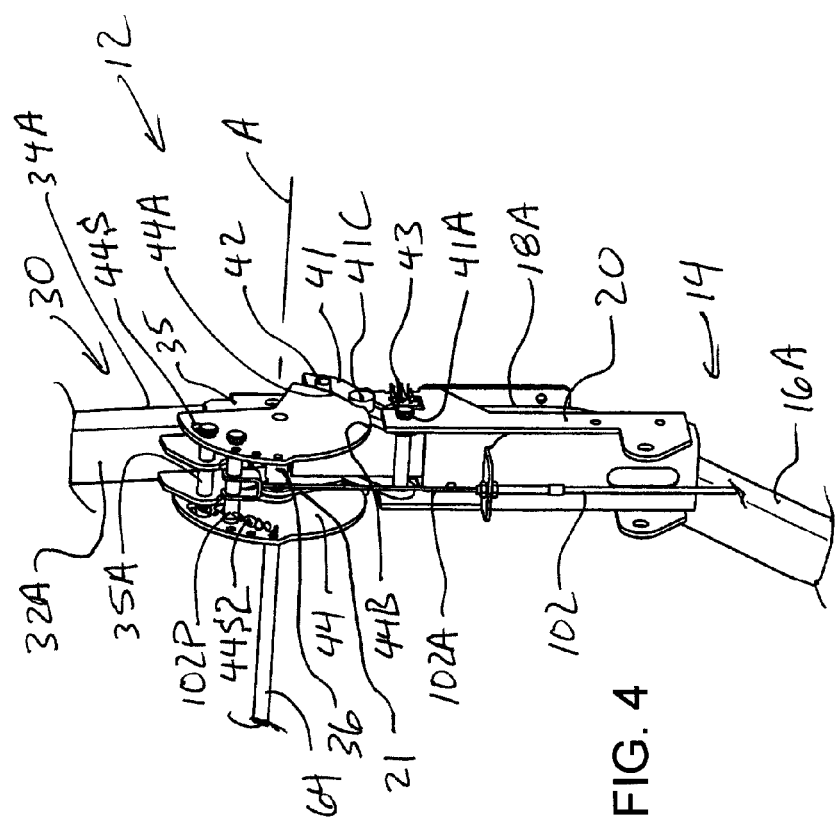
FIG. 4 is a close up perspective view of one side of the roll bar assembly shown in FIG. 3.
Figure 6:
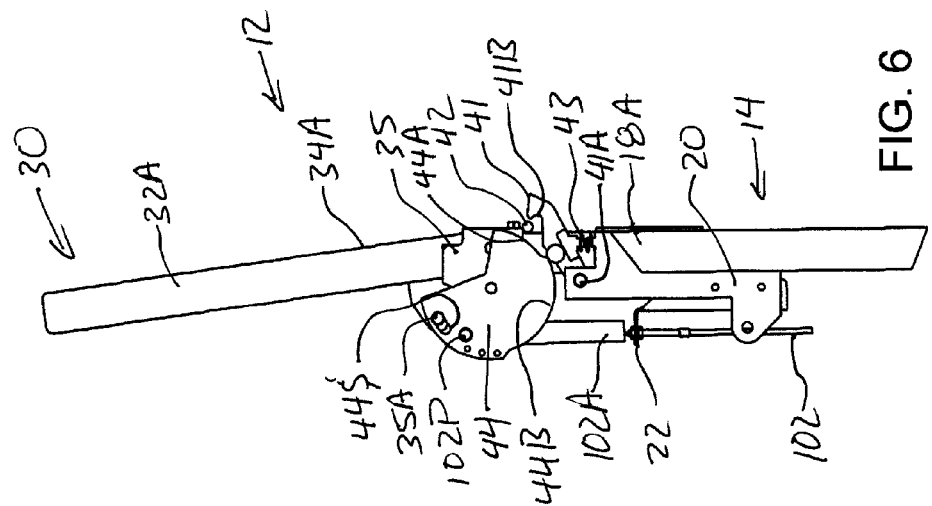
FIG. 6 is a close up side view of the roll bar assembly showing upper portion in the upright position and with the lock disengaged.

As can be seen in FIGS. 3-8, in this example, lower portion 14 and upper portion 30 include a lock which is biased to secure upper portion 30 in the raised position when upper portion 30 is in the raised position. As can be seen in FIGS. 4-8 by viewing only one side of roll bar assembly 12, the lock for securing upper portion 30 in the raised position shown in FIG. 4 is a latch mechanism 40 which includes a latch member 41 which is pivotably mounted to a bracket 20 to pivot about a shaft 41A which is carried by bracket 20. Bracket 20 is fixed to upper end 18A of bottom member 16A. As can be best seen in FIG. 6, latch member 41 includes a notch 41B that is shaped to engage a rod 42. Rod 42 is generally horizontal and oriented transversely and is fixed to a bracket 35 that is fixed to the lower end 34A of side member 32A of upper portion 30. Latch member 41 is biased by a spring 43 toward the latched position shown in FIGS. 4 and 5. Thus, latch member 41 is biased by spring 43 to secure upper portion 30 in the raised position. Latch member 41 further presents a boss 41C. A cam 44 is rotatably mounted to a bracket 35 for rotation about an axis passing through the center of shaft 36 (shown in FIG. 4). Bracket 35 is fixed to the lower end 34A of side member 32A of upper portion 30. Cam 44 engages boss 41C with two portions: a first recessed cam portion 44A and a second offset cam portion 44B. As a downward movement of cable 102 rotates cam 44 counterclockwise as viewed in FIGS. 3-8, boss 41C of latch member 41 is contacted by second offset cam portion 44B of cam 44 which has a larger radius than first recessed cam portion 44A. This urges latch member 41 out against spring 43 and disengages latch member 41 from rod 42. This unlatches upper portion 30 from lower portion 14 and makes it possible for upper portion 30 to fold down relative to lower portion 14. The skilled reader should understand that the same latch and cam mechanism is preferably identically repeated on the opposite side of roll bar assembly 14 between upper end 18B of bottom member 16B and the lower end 34B of side member 32B. The skilled reader should further consider that the latch mechanism described above is merely one way to provide a lock that is biased to lock upper portion 30 in the raised position. A multitude of other mechanisms well known in the art, may be selected for providing such a biased lock that can be selectively disengaged to allow upper portion 30 to move to a lowered position. Just one example of an alternate locking mechanism might include a spring biased pin which engages corresponding holes in lower portion 14 and upper portion 30 which align when upper portion 30 is in the raised position. The spring biased pin could be connected to the raising and lowering mechanism such that it is urged against its spring bias to unlock upper portion 30 when an operator applies a force to lower upper portion 30.

Raising and lowering mechanism 50 includes an operator lever 100 and a spring assembly 60. Raising and lowering mechanism 50 functions in combination with an operator lever 100 to cause the lowering and raising of upper portion 30.

Figure 5:
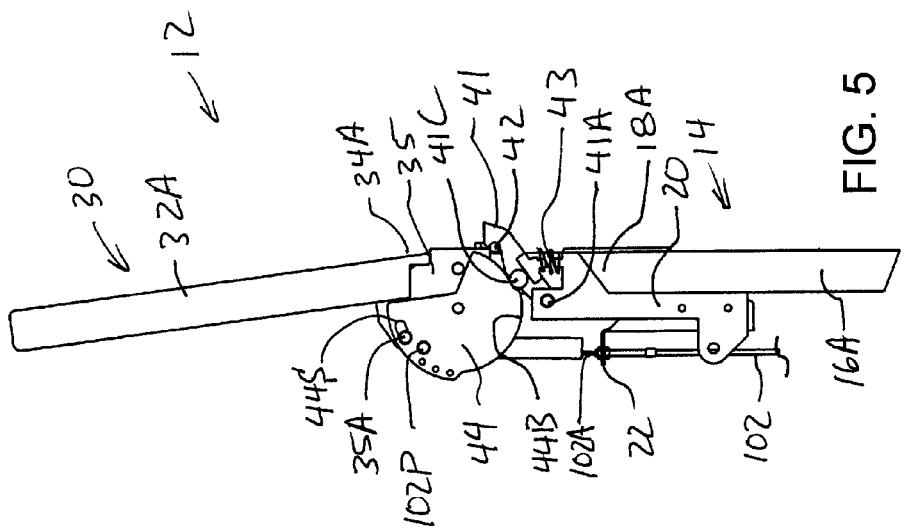
FIG. 5 is a close up side view of the roll bar assembly showing the upper portion in the upright position with the lock engaged.
Figures 7, 8:
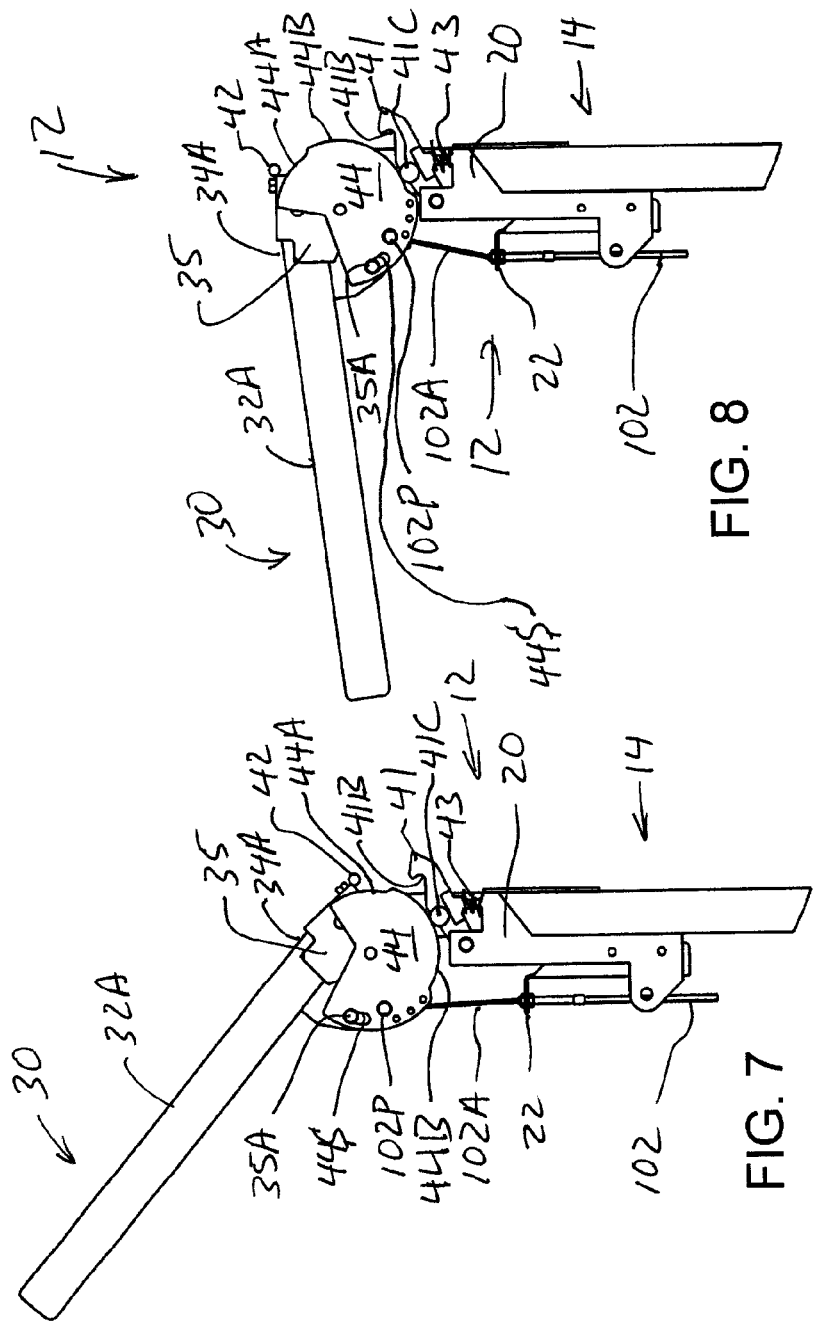
FIG. 7 is a close up side view of the roll bar assembly showing the upper portion in a position which is between the raised position and the lowered position and showing the lock disengaged.
FIG. 8 is a close up side view of the roll bar assembly showing the upper portion in the lowered position and the lock disengaged.

We will first consider how raising and lowering mechanism 50 functions to lower upper portion 30 from the raised position to the lowered position. In this example operator lever 100, which may take the form of a handle or a pedal, is connected by cable 102 to cam 44. In this example, cable 102 connects to a sliding bracket 22 shown in FIGS. 3-8. An upper cable portion 102A connects between sliding bracket 22 and a pin 102P that is mounted to cam 44. As can be seen in FIG. 3, a shaft 64 extends between cam 44 and a cam 144 that is mounted to the opposite side of roll bar assembly 12. As can be seen in FIG. 4, cam 44 includes two opposite, identical plates that are located on opposite sides of upper end 18A of bottom member 16A. As can be seen in FIG. 3, the same arrangement exists for cam 144 on the opposite side for bottom member 16B. Shaft 64 is fixed to both side plates of cam 44 as well as both side plates of the cam 144 on the opposite side. Bracket 35 that is fixed to side member 32A presents ears on both sides of side member 32A which present co-axial bores for receiving shaft 64. A bracket 21 is fixed to the upper end 18A of side member 16A supports a bushing 36 that, in turn, also receives shaft 64. Thus cams 44, 144, shaft 64 and upper portion 30 are all able to rotate about an axis A shown in FIG. 4. Axis A is fixed in relation to lower portion 14. As can be seen in FIG. 4, bracket 35 mounted to side member 32A of upper portion 30 includes a pin 35A which rides in a constant radius slot 44S. Also, a tension spring 44S2 connects between cam 44 and pin 35A that biases cam 44 clockwise toward pin 35A. Slot 44S, first recessed cam portion 44A and second offset cam portion 44B are arranged so that, as cable portion 102A pulls on cam 44, cam 44 rotates counterclockwise as second offset cam portion 44B rotates counterclockwise to encounter boss 41C of latch member 41. As is shown in FIG. 5, and as described above, this causes latch member 41 to release rod 42. Latch member 41 releases rod 42 before the clockwise end of slot 44S encounters pin 35A. Once the clockwise end of slot 44S of cam 44 encounters pin 35A, (which is fixed to bracket 35 which is, in turn, fixed to upper portion 30) cam 44 ceases its rotation relative to bracket 35. Since latch mechanism 40 is now unlatched, cam 44, bracket 35 and upper portion 30 are now free to rotate counterclockwise as seen in FIGS. 4-8 around the axis A (shown in FIG. 4) as cam 44 and bracket 35 are pulled by cable portion 102A. Upper portion 30 continues to rotates until it reaches the lowered position shown in FIG. 8. if cable 102 and cable portion 102A continue to transmit sufficient force.

The operation described above occurs in reverse when the operator releases pressure from operator lever 100. As can be seen in FIG. 3, the opposite side of roll bar assembly 12 includes a spring assembly 60 that biases upper portion 30 toward the raised position. Accordingly, when the operator releases pressure from operator lever 100, upper portion 30 rotates from the lowered position shown in FIG. 7 back to the raised position shown in FIGS. 3 and 4 with the exception that slot 44S and pin 35A are in the relative positions shown in FIG. 4 during the return stroke so that latch member 41 is in the position shown in FIG. 4 before upper portion 30 arrives in the position shown in FIG. 4. Accordingly, during the return stroke, pin 42A encounters a sloped upper surface of latch member 41 to cause latch member 41 to turn out to receive pin 42A. Also because spring 44S2 biases cam 44 clockwise, boss 41C of latch assembly 40 remains in contact with first recessed cam portion 44A thereby maintaining latch assembly 40 in the latched position.

Figure 2:
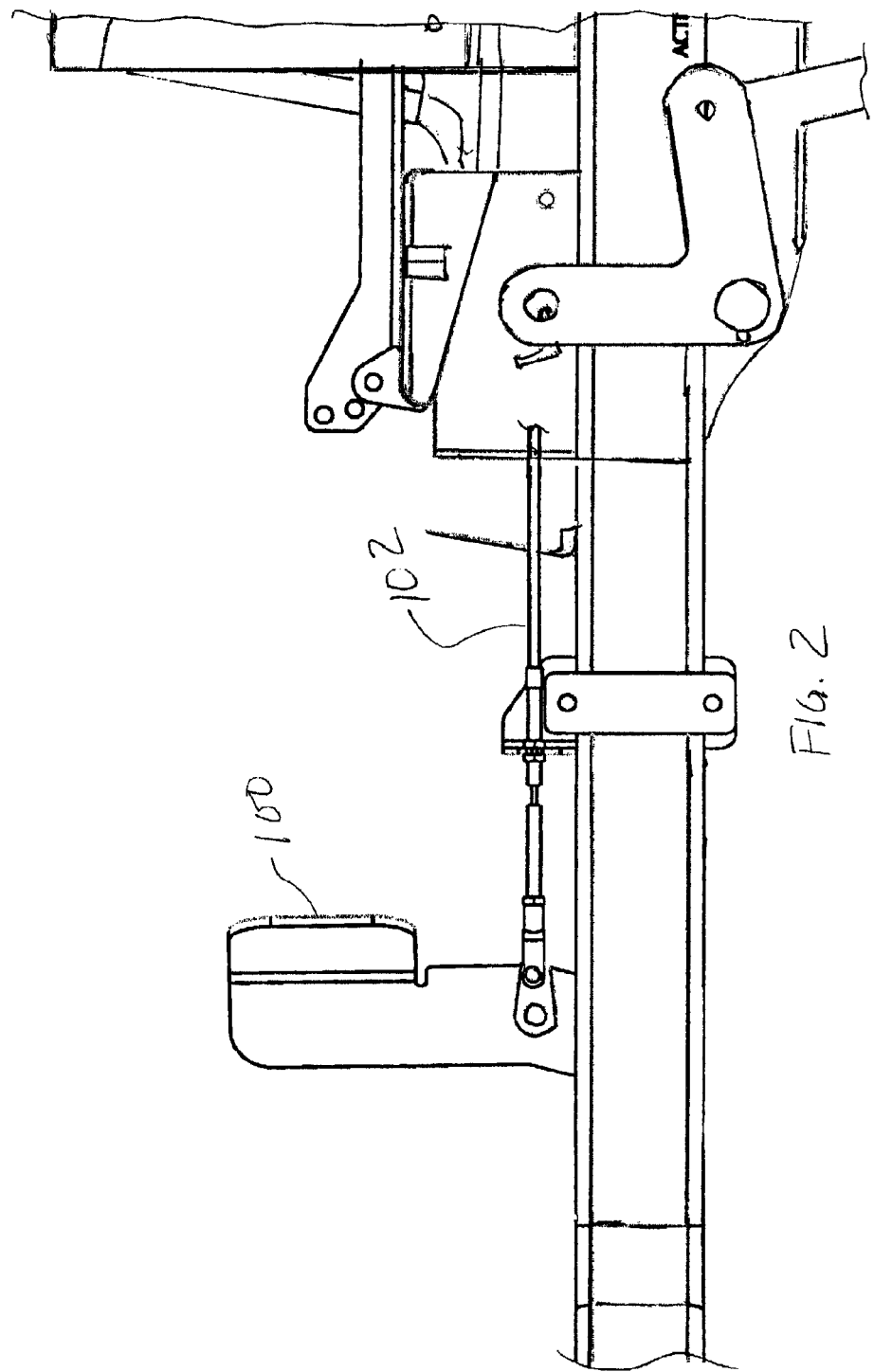
FIG. 2 is a side view showing an operator lever mounted to the vehicle.

Operator lever 100 is shown in FIG. 2 as a foot pedal but can also be a hand lever or other such member for receiving force from an operator. Operator lever 100 is connected to a cable 102. Lever 100 is biased in the position shown in FIG. 2 by tension which is applied by cable 102. Cable 102 routed to connect to sliding member 22 mounted to bracket 20 of roll bar assembly 12 shown in FIG. 3. Cable 102 is in tension because spring assembly 60 shown in FIG. 3 pushes cam 144 in a clockwise direction as seen in FIG. 3 which in turn applies a torque to shaft 64 which further pushes cam 44 in a clockwise direction to apply to an upper cable portion 102A which is connected to cable 102. When operator lever 100 is up as shown in FIG. 2, cable 102 is not pulling down on cam 44. When operator lever 100 is pressed forward by an operator, cable 102 pulls on cam 44 which rotates counterclockwise as seen from the perspective of FIG. 3 which causes the release of latch mechanism 40 and the lowering of upper portion 30 as described above.

The skilled reader will appreciate that, for example, an actuator may be interposed between operator lever 100 and cam 44 so that the lowering and even the raising of upper portion 30 may be powered in response to a switch which is activated by the rotation of lever 100. So, for example, in an embodiment having a powered actuator, lever 100 might close a switch for activating a powered actuator and might also be biased toward the position shown in FIG. 2, so that when the operator ceases applying a force to lever 100, the switch would open and the actuator would return upper portion 30 to the raised position shown in FIGS. 1, 3 and 4. As is well known in the art, power may be supplied to an actuator in any one of a number of forms including, but by no means limited to, hydraulic power, electric power and pneumatic power.

Second Embodiment

Figure 9:
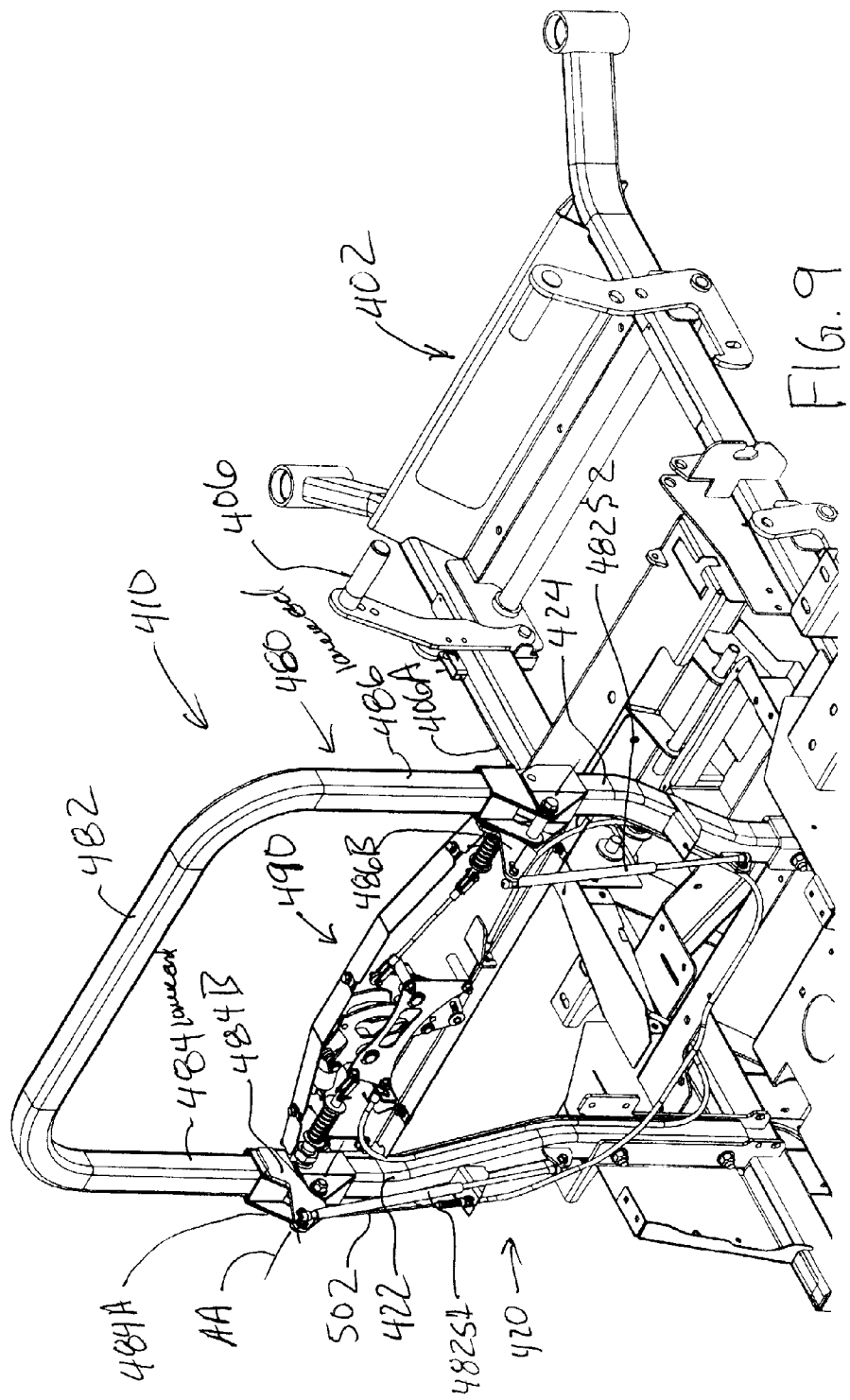
FIG. 9 is a perspective view of a second embodiment of a rollover protection apparatus showing the upper portion of the roll bar assembly in a raised position.

A second embodiment of the improved rollover protection apparatus, namely rollover protection apparatus 410, is shown in FIGS. 9-13. As can be seen in FIG. 9, rollover protection apparatus 410 includes a lower portion 420 and an upper portion 480. In this example, lower portion 420 includes two upright supports 422 and 424 which are rigidly fixed to vehicle frame 402. Upper portion 480, in this example, is a generally upside down U shaped member 482 which is pivotably mounted at its lower ends 484 and 486 to the upper ends of upright supports 422 and 424 respectively. In this example, lower portion 420 also includes a releasable lock mechanism 490 which will be described in greater detail below. Releasable lock mechanism 490 is coupled to a lock releasing device, which in this example, includes a manually operable foot lever 406 pivotably mounted to frame 402 and a lock actuation cable 406A. Foot lever 406 may be replaced by any one of a number of actuation devices which may even include electrically powered or hydraulically powered devices which may be activated by a small manual input such as the pushing of a button or the toggling of a switch. When, in this example, foot lever 406 is pivoted by an operator from the position shown in FIG. 9 to the position shown in FIG. 13, cable 406A is pulled. Cable 406A is connected to releasable lock mechanism 490 so that, when cable 406A is pulled, releasable lock mechanism 490 initially moves from a locked position shown in FIG. 10 to a released position shown in FIG. 11. When releasable lock mechanism 490 is in the released position, it is possible for upper portion 480 to pivot from the raised position shown in FIG. 9 toward the lowered position shown in FIG. 13.

As can be seen in FIG. 9, upper portion 480 is pivotably mounted to lower portion 420 for rotation about axis AA. In FIGS. 9 and 13, axis AA is shown to be offset behind the centerlines of the members of upper and lower portions 480 and 420. As can be seen in FIG. 9, a bracket 484A is fixed to and extends back from the lower end 484 of upper member 482. Bracket 484A attaches to an upper portion cable which is used associate the movement of upper portion 480 with releasable lock mechanism 490 as will be described in greater detail below. A second set of opposite brackets 484A and 484B extend from the opposite sides of the lower portions of upper portion 480 and connect to a pair of upper portion return springs 482S1 and 482S2. Return springs 482S1 and 482S2 connect between brackets 484A and 484B and upright supports 422 and 424 respectively of lower portion 420 and bias upper portion 480 toward the upright position shown in FIG. 9.

Figure 10:
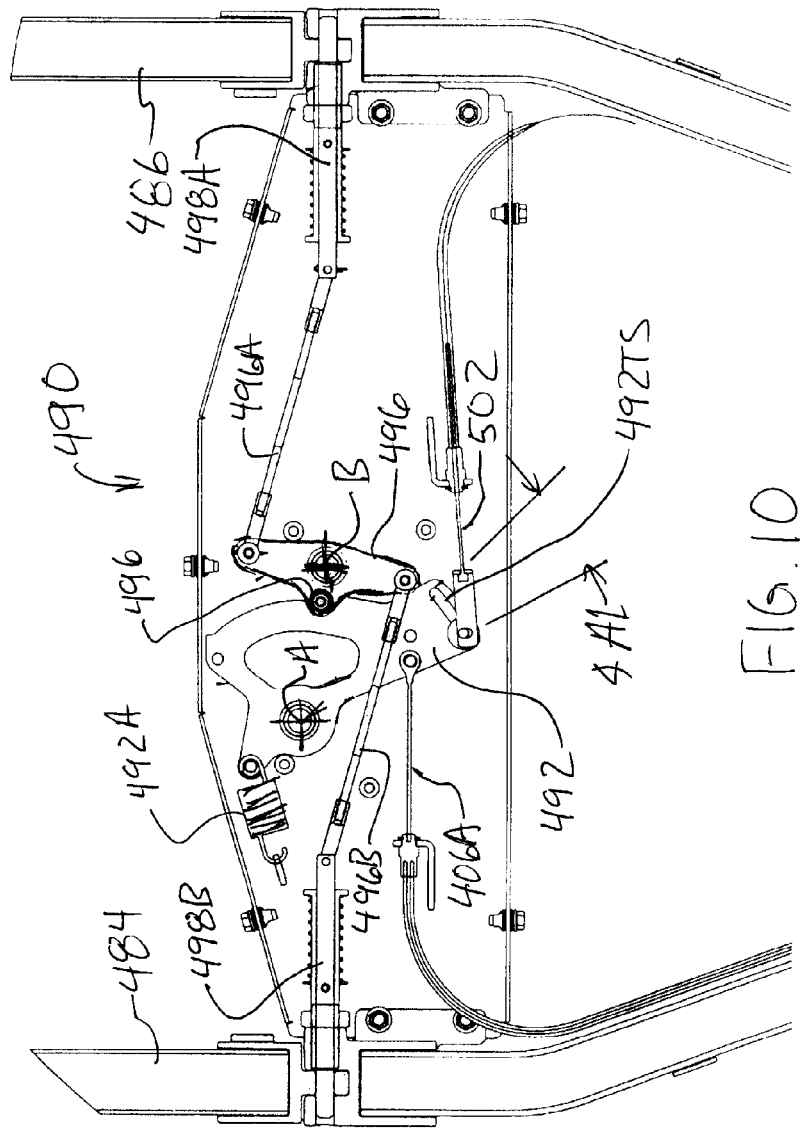
FIG. 10 is a rear view of the second embodiment of the rollover protection apparatus showing the upper portion of the roll bar assembly in the raised position with locking mechanism engaged.

Releasable lock mechanism 490 can be better understood by referring to FIGS. 9-12. In this example, lock mechanism 490 includes a cam plate 492 and a bell crank 496. As can be best seen in FIGS. 10 and 11, cam plate 492 is pivotably mounted for rotation about axis A which is generally longitudinal and bell crank 496 is pivotably mounted for rotation about axis B which is also generally longitudinal. Cam plate 492 is spring biased in the counter-clockwise direction by spring 492A. As can be best seen in FIGS. 10 and 11, bell crank 496 is connected at its opposite ends to two opposing rods 496A and 496B to which are pivotably jointed at their distal ends to two opposite latch pins 498A and 498B. Latch pins 498A and 498B are received by the co-axial bores of a clevis fittings 422A and 424A fixed to the upper ends of upright supports 422 and 424 respectively and also by the aligned co-axial bores of corresponding lug fittings 484L and 486L fixed to lower ends 484 and 486 respectively of upper portion 480. Thus, when these corresponding clevis and lug fittings associated with the upper and lower portions of the roll bar assembly receive latch pins 498A and 498B, upper portion 480 of roll bar assembly 410 is locked in the upright position as shown in FIG. 9. The skilled reader should observe by referring to FIGS. 9 and 13, that axis AA, which is the axis of rotation of upper portion 480 with respect to lower portion 420, is offset from the center line of latch pins 498A and 498B, so that the hinge structure for the pivot joint between upper and lower portions 480 and 420 and latch pins 498A and 498B secure upper portion 480 in the upright position as shown in FIG. 9 when latch pins 498A and 498B are engaged as shown in FIG. 10. The skilled reader can also observe that, in this example, lug fittings 484L and 486L have extending portion 484L2 and 486L2 which are generally symmetrical and identical. Extending portion 484L2 may be best seen in FIG. 13A. As can be seen in FIG. 13A, extending portion 484L2 is shaped to block clevis 422C so that it is not possible for latch pin 498A to enter lug clevis 422C when upper portion 480 is moved away from the upright position shown in FIG. 9. The same arrangement is repeated on the other side so that it is not possible for either latch pin 498A or 498B to enter either clevis 422C or 424C respectively when upper portion 480 is moved away from the upright position shown in FIG. 9.

Figure 11:
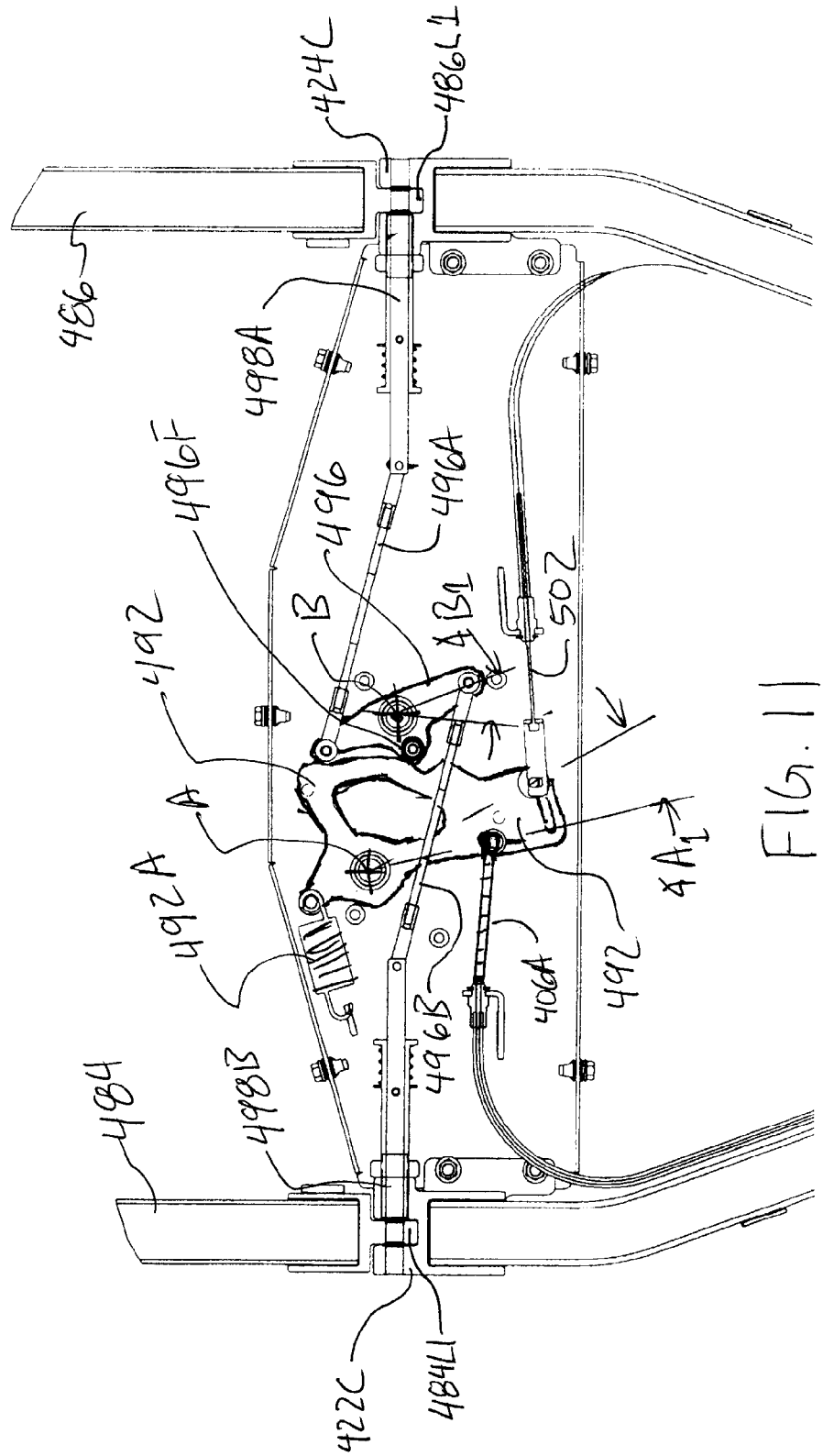
FIG. 11 is a rear view of the second embodiment of the rollover protection apparatus showing the upper portion of the roll bar assembly in the raised position with locking mechanism disengaged.

As is noted above, in this example, cam plate 492 shown in FIG. 10 is pivotably mounted for rotation about axis A and is spring biased in the counterclockwise direction. Bell crank 496 is pivotably mounted for rotation about axis B. As can be seen in FIGS. 10 and 11, bell crank 496 presents a cam follower 496F which is normally received by a recess 492R in the periphery of cam plate 492. As can also be seen in FIGS. 9 and 10, the distal end of lock actuation cable 406A is connected to cam plate 492. Still further, the proximate end of upper portion actuation cable 402 is also connected to cam plate 492 but by means of a pin 502A which is slidably received by a tangential slot 492TS defined near the periphery of cam plate 492. The result of this arrangement is that when lock actuation cable 406A pulls on cam plate 492, cam plate 492 rotates clockwise through angle Al from a first locked position shown in FIG. 10 to a second unlocked position shown in FIG. 11. When this occurs, cam follower 496F of bell crank 496 is forced out of recess 492R which forces the counter clockwise rotation of bell crank 496. All of this has been arranged so that as cam plate 492 rotates by angle A between the first locked position to the second unlocked position, sufficient rotation of bell crank 496 occurs in order to withdraw latch pins 498A and 498B sufficiently from the corresponding lugs of the lock structure common to upper portion 480 so that upper portion 480 can freely rotate from the raised position shown in FIG. 9 toward the lowered position shown in FIG. 13.

Once the operator has depressed foot lever 406 sufficiently to withdraw latch pins 498A and 498B from the respective fittings, and in particular lug fittings 484L1 and 486L1 as described above, thus unlocking upper portion 480 from lower portion 420, the operator may continue pressing foot lever 406. When this occurs, lock actuation cable 406A continues pulling on cam plate 492. Recall that at this point, cam plate 492 is in the unlocked position shown in FIG. 11 and the pin at the end of upper portion actuation cable 502 is at the extreme end of tangential slot 492TS. Thus, now, cam plate 492 begins pulling on the proximate end of upper portion actuation cable 502 as it continues to rotate clockwise until cam plate 492 reaches a third upper portion fold down position shown in FIG. 12. Note that in FIG. 12, cam plate 492 is rotated as far as possible in the clockwise direction, yet bell crank 496 has not changed its position from FIG. 11. This is because the arc describing the outer edge of cam plate 492 extending counterclockwise from recess 492R is centered on axis A. Thus, cam follower 496F does not move even as cam plate 492 rotates from the second unlocked position shown in FIG. 11 to the third upper portion fold down position shown in FIG. 12. As the proximate end of upper portion actuation cable 502 is pulled to the position shown in FIG. 12, the distal end of actuation cable 502 pulls on bracket 484B shown in FIGS. 9 and 13. This causes upper portion 480 to rotate down to the lowered position shown in FIG. 13.

Once upper portion 480 has cleared the overhead obstacle, and once the operator has released pressure from foot lever 406, upper portion 480 is free to return to the upright position shown in FIG. 9. Upper portion pivots back to the upright position at least in part because it is biased to do so by upper portion return springs 482S1 and 482S2. When this occurs, brackets 484A attached to the fitting at the lower ends of member 484 pulls on cable 502. Cable 502 then pulls on cam plate 492 (shown in FIG. 12) to cause cam plate 492 to pivot in the counter clockwise direction from the position shown in FIG. 12 to the position shown in FIG. 11. When cam plate 492 is in the position shown in FIG. 11, upper portion 480 (shown to include members 484 and 486 in FIG. 11) is in the upright position (as is also shown in FIG. 9), but latch pins 498A and 498B are still withdrawn from lugs 484L1 and 484L2 and at least the outboard portions of clevises 422C and 424C respectively. This is the case because cam follower 496F is at the edge of recess 492R but has not been received by recess 492R. At this point cable 502 has no more travel remaining to cause further counterclockwise rotation of cam plate 492. At this point, spring 492A continues to pull cam plate 492 clockwise as cam follower 496F rolls down into recess 492R. When this occurs, bell crank 496 rapidly rotates clockwise thereby allowing the outwardly spring biased latch pins 498A and 498B to slide out to reengage lugs 484L1 and 484L2 and the outboard portions of devises 422C and 424C respectively. This causes upper portion 480 to be locked and secured in the upright position shown in FIG. 9.

With the second embodiment apparatus 410 described above, it is possible for the operator to merely press lever 406 sufficiently to unlock upper portion 480 prior to encountering an overhead obstacle. With apparatus 410 it is possible the obstacle itself could provide a force to push upper portion 480 down while clearing the obstacle. Although this might not be a recommended way of using apparatus 410, and although it might cause damage to either the obstacle or apparatus 410, less damage would likely occur than would occur if an upright, fixed roll over protection bar or hoop were to simply collide with an overhead obstacle. The above described apparatus 410, once unlocked as described above, is able to rotate down toward the lowered position shown in FIG. 13 in response to pressure from an obstacle. In such as case cable 502 would buckle where it connects to bracket 484A (see FIG. 9). Extending portions 484L2 and 486L2 of lug fitting 484L and 486L would block the retracted latch pins 498B and 498A respectively from entering the space needed for lugs 484L and 486L until upper portion 480 was returned to the upright position shown in FIG. 9.

Thus, such an apparatus would accommodate a mode where upper portion 480 was merely unlocked to allow upper portion 480 to yield to an obstacle and wherein once the obstacle was cleared, upper portion 480 would return to the upright position and be secured and locked. Thus, the apparatus described above, provides a structure that can be folded down to avoid overhead obstacles, but which, as a default mode of operation, is locked in an upright position suitable for protecting an operator during a roll over, thus providing a more versatile and safer vehicle.

The structures described above merely provide example embodiments for accomplishing the objectives of the invention. To accomplish the objectives of the invention, it is essential that an upper portion of a roll bar assembly unlock in response to an operator input so that the upper portion can move to a lowered fold-down position. To accomplish the objectives of the invention, it is also essential that the upper portion of the roll bar assembly be biased to return to the upright raised position and to lock after the obstacle has been cleared.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A rollover protection apparatus, comprising:
   (a) roll bar assembly including a lower portion that is mounted to a vehicle frame and an upper portion which is pivotably mounted to the lower portion so that the upper portion is operable to pivot between a raised position and a lowered position, the upper portion being biased toward the raised position,
   (b) a releasable lock associated with the upper portion and the lower portion for securing the upper portion in the raised position, and,
   (c) a lock releasing device for releasing the releasable lock associated with the upper portion and the lower portion, such that when the lock releasing device is activated, the releasable lock releases so that an overhead obstacle is able to move the upper portion of the roll bar assembly toward the lowered position as the roll bar assembly passes under the overhead obstacle and whereby the upper portion, being biased toward the raised position, returns to the raised position after clearing the overhead obstacle, and, so that if the lock releasing device is no longer being activated, the lock returns to the locked position thereby securing the upper portion in the raised position.

2. The rollover protection apparatus of claim 1, wherein: the releasable lock is arranged such that the releasable lock is not able to return to the locked position unless the upper portion of the roll bar assembly is in the raised position.

3. A rollover protection apparatus, comprising:
   (a) roll bar assembly including a lower portion that is mounted to a vehicle frame and an upper portion that is pivotably mounted to the lower portion, the upper portion operable for pivoting between a raised position and a lowered position, the upper portion being biased toward the raised position,
   (b) a releasable lock associated with the upper portion and the lower portion for securing the upper portion in the raised position,
   (c) a lock releasing and upper portion actuation device that is operable for releasing the releasable lock and for pivoting the upper portion of the roll bar assembly from the raised position toward the lowered position,
   (d) a manual actuator operatively associated with the lock releasing and upper portion actuation device, the manual actuator arranged such that when the manual actuator is moved from a first position to a second position the releasable lock is unlocked and such that when the manual actuator is moved from the second position toward a third position, the upper portion of the roll bar pivots away from the raised position toward the lowered position.

4. The rollover protection apparatus of claim 3, wherein: the manual actuator is selected from a group consisting of a pedal and a lever.

5. The rollover protection apparatus of claim 3, wherein: the upper portion of the roll bar assembly is biased to return the raised position when the manual actuator is in the first position or the second position.

6. The rollover protection apparatus of claim 5, wherein: the lock is biased to return to the locked position and the upper portion and the lower portion of the roll bar are arranged such that the lock will return to the locked position if the upper portion of the roll bar is in the raised position and the manual actuator is in the first position.

7. The rollover protection apparatus of claim 6, wherein: the manual actuator and the lock releasing and upper portion actuation device are arranged such that if the manual actuator is moved from the second position toward the third position and if subsequent to such movement of the manual actuator, the application of manual force to the manual actuator ceases, the manual actuator will return to the first position, the upper portion will return to the raised position and the releasable lock will re-engage to lock the upper portion in the raised position.

8. A rollover protection apparatus, comprising:
   (a) roll bar assembly including a lower portion that is mounted to a vehicle frame and an upper portion which is pivotably mounted to the lower portion for pivoting between a raised position and a lowered position,
   (b) a releasable lock associated with the upper portion and the lower portion for securing the upper portion in the raised position,
   (c) a lock releasing and upper portion actuation device that is operable for releasing the releasable lock and for moving the upper portion from the raised position toward the lowered position, and,
   (d) a movable element suitable for receiving a manually applied force, the movable element operably associated with the lock releasing and upper portion actuation device such that when a force is applied to the movable element, the releasable lock unlocks and the upper portion pivots toward the lowered position and such that if the application of the force to the movable element ceases, the upper portion pivots back to the raised position and the releasable lock re-engages to secure the upper portion in the raised position.

* * * * *